United States Patent [19]

Schappler

[11] Patent Number: 4,903,058
[45] Date of Patent: Feb. 20, 1990

[54] RE-USABLE ELECTRONIC FLASH UNIT FOR DISPOSABLE SINGLE-USE CAMERA

[75] Inventor: Joseph J. Schappler, Rochester, N.Y.

[73] Assignee: Eastman Kodak Company, Rochester, N.Y.

[21] Appl. No.: 363,558

[22] Filed: Jun. 8, 1989

[51] Int. Cl.⁴ .............................................. G03B 17/05
[52] U.S. Cl. .................. 354/145.1; 354/147; 354/288
[58] Field of Search .................. 354/126, 129, 145.1, 354/147, 288, 75; 362/3

[56] References Cited

U.S. PATENT DOCUMENTS

| 3,577,899 | 5/1971 | Ikegami | 354/126 |
| 4,079,395 | 3/1978 | Filippis et al. | 354/145.1 |
| 4,106,077 | 8/1978 | Furda | 354/126 |
| 4,166,680 | 9/1979 | Maitani | 354/126 |
| 4,189,222 | 2/1980 | Maitani | 354/126 |

FOREIGN PATENT DOCUMENTS 1032494  3/1964  United Kingdom ............ 354/145.1

Primary Examiner—A. A. Mathews
Attorney, Agent, or Firm—Roger A. Fields

[57] ABSTRACT

A disposable single-use camera is generally of the type wherein an inner camera part is pre-loaded with film and includes a taking lens, and an outer sealed pack contains the camera part and has an opening for the taking lens. The inner camera part has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access ports in order to connect the flash unit to the disposable camera. The flash synchronization pins are supported on a folding arm which is foldable to a storage position to make the flash unit compact and to conceal the pins when the flash unit is not connected to the disposable camera.

6 Claims, 4 Drawing Sheets

RE-USABLE ELECTRONIC FLASH UNIT FOR DISPOSABLE SINGLE-USE CAMERA p CROSS-REFERENCE TO A RELATED APPLICATION

Reference is made to commonly assigned copending U.S. application Ser. No. 157,239, now U.S. Pat. No. 4,801,957, issued 1/31/89, entitled DISPOSABLE SINGLE-USE CAMERA AND ACCESSORY RE-USABLE ELECTRONIC FLASH UNIT and filed February 18, 1988 in the name of Alan V. Vandemoere.

FIELD OF THE INVENTION

The invention relates generally to the field of photography, and particularly to a disposable single-use camera and an accessory re-usable electronic flash unit intended for use with the disposable camera.

DESCRIPTION OF THE PRIOR ART

Recently, a disposable single-use 35 mm camera referred to as the "Quick-Snap" was introduced by Fuji Photo Film Co. Ltd., and another disposable single-use 35 mm camera referred to as the "Fling 35" was introduced by Eastman Kodak Co. Generally, each disposable camera is a point-andshoot type and comprises (1) a plastic inner camera part including a taking lens, a film metering mechanism, and a shutter, and (2) a cardboard outer sealed pach which contains the inner camera part and has respective openings for the taking lens and for a shutter release button, a frame counter window, a film advance thumbwheel, and a simple see-through viewfinder, of the inner camera part. At the manufacturuer, the inner camera part is loaded with a conventional 24-exposure 35 mm film cartridge and substantially the entire length of the unexposed filmstrip is factory prewound from the cartridge into a supply chamber of the camera part. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera part from the cardboard sealed pack and then removes the filmstrip from the camera part. The filmstrip F is processed, and the camera part and the opened pack are thrown away.

While neither of these disposable cameras is intended for use with an electronic flash unit, Fuji Photo Film Co. Ltc. has now made available a disposable camera having a built-in electronic flash unit. Both the camera part and the built-in flash unit are contained within the sealed pack. When the disposable camera is sent to the photofinisher, the same must be done to the built-in flash unit. The disadvantage is that this arrangement significantly increases the selling price of the camera assembly.

THE CROSS-REFERENCED APPLICATION

The application cross-referenced above discloses a disposable single-use camera generally of the type wherein an inner camera part is pre-loaded with film and includes a taking lens, and an outer sealed pack contains the camera part and has an opening for the taking lens. According to the invention, the inner camera part has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access ports, whereby the flash unit is removably connected to the inner camera part.

Since the accessory flash unit in the cross-referenced application is removable from the disposable camera, only the disposable camera need be returned to the photofinisher; the flash unit is retained by the customer for re-use with a fresh camera. However, the flash unit is not compact, and the flash synchronization pins are exposed when the flash unit is not connected to a disposable camera.

SUMMARY OF THE INVENTION

The above-described problems associated with prior art disposable single-use cameras and integral or accessory electronic flash units are believed solved by the invention.

According to the invention, there is provided an improved accessory re-usable electronic flash unit intended for use with a disposable single-use camera comprising an (a) inner camera part pre-loaded with film and including a taking lens, a shutter, and flash synchronization access ports, and (b) an outer sealed perforable pack containing the camera part and having an opening for the taking lens, wherein said flash unit has electrically conductive flash synchronization pins shaped to perforate the outer sealed pack to enter the access ports in order to connect the flash unit to the inner camera part, and wherein the improvement comprises:

a movable, preferably folding, arm supporting the flash synchronization pins and adapted to be moved or folded to a storage position to make the flash unit compact and to be moved or unfolded to an operative position to dispose the pins to perforate the outer sealed pack to enter the access ports.

More particularly, in the flash unit, the movable arm supports the flash synchronization pins facing inwardly relative to the flash unit to conceal the pins when the movable arm is in its storage position and is arranged to expose the pins when the movable arm is in its operative position.

DETAILED DESCRIPTION OF THE PREFERRED EMBODIMENT

The invention is disclosed in connection with a 35mm camera and an electronic flash unit. Because such a camera and flash unit are widely known, this description is directed in particular to photographic elements forming part of or cooperating directly with the invention. It is to be understood, however, that other elements not specifically shown or described may take various forms known to persons of ordinary skill in the art.

Figure 1:
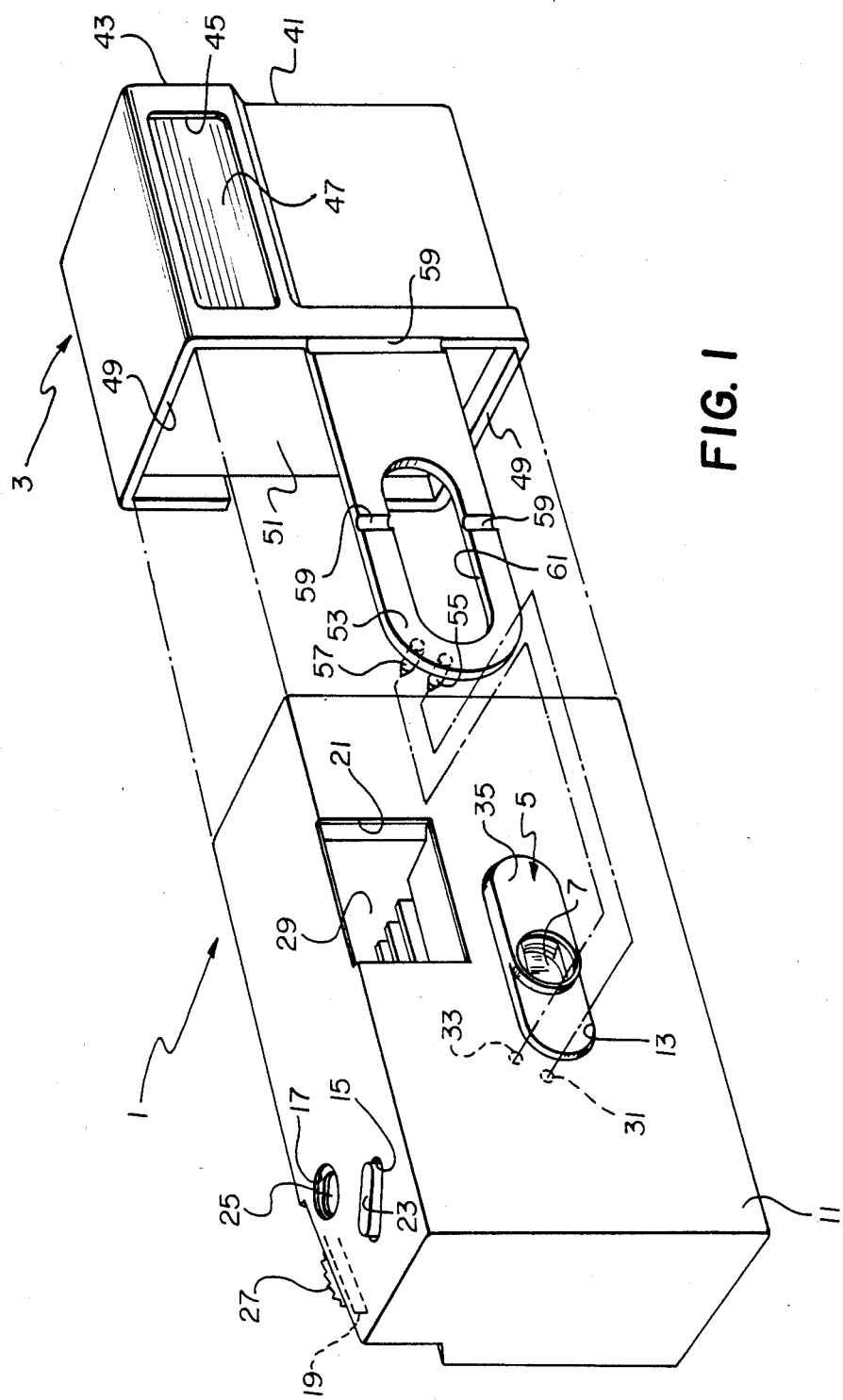
FIG. 1 is a front perspective view of a disposable single-use camera and an accessory re-usable electronic flash unit, according to a preferred embodiment of the invention.
Figure 4:
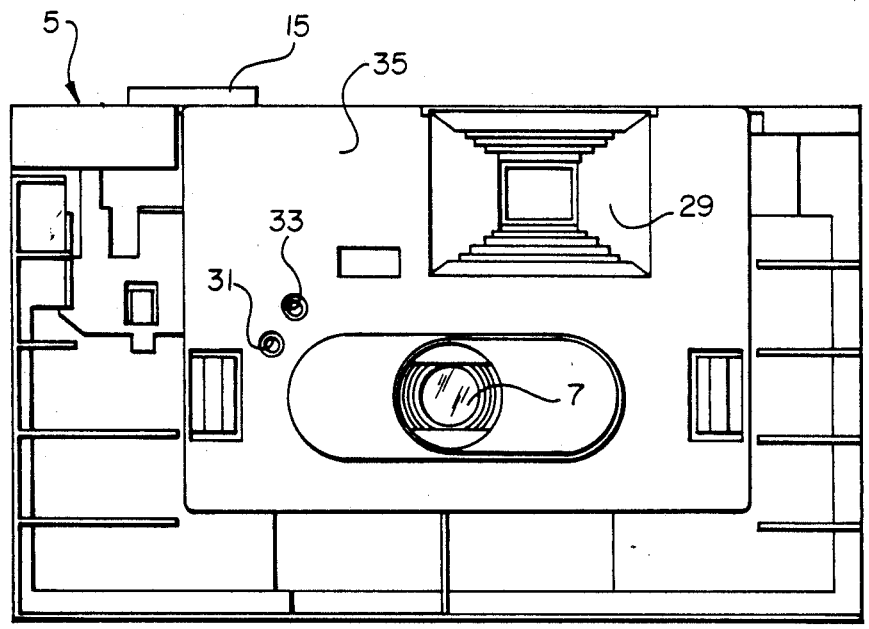
FIG. 4 is a front elevation view of an inner camera part of the single-use camera, showing a front face of the camera part and a taking lens.
Figure 5:
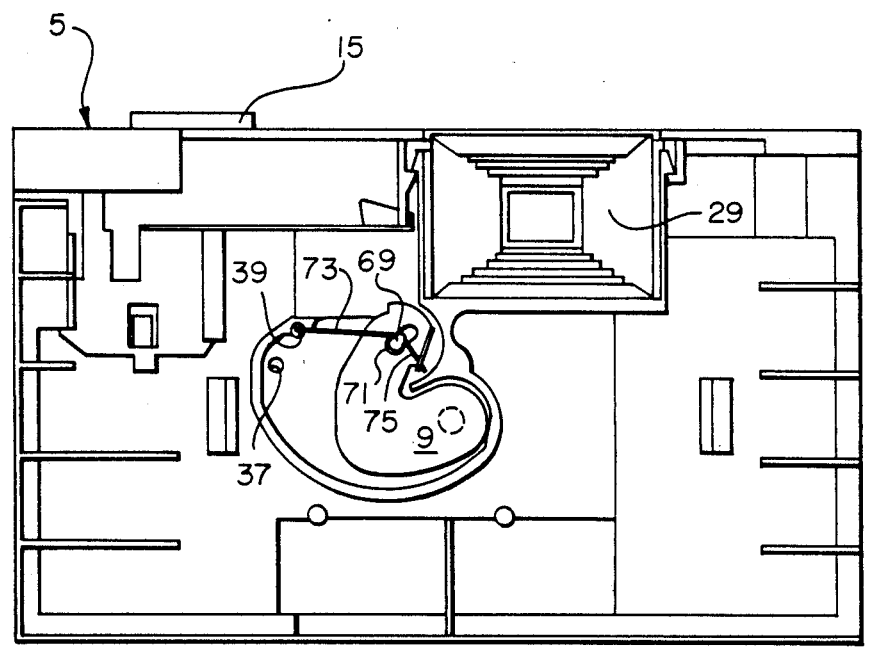
FIG. 5 is a front elevation view of the inner camera part, showing a portion of its front face and the taking lens removed to illustrate a closed shutter.

Referring now to the drawings, FIG. 1 depicts a disposable single-use 35 mm camera 1 and an accessory re-usable electronic flash unit 3. As shown in FIGS. 1, 4, and 5, the disposable camera 1 is a point-and-shoot type and comprises (1) an inner camera part 5 including a taking lens 7, a film metering mechanism (not shown), and a single blade shutter 9 and (2) an outer sealed pack 11 which contains the inner camera part and has respective openings 13, 15, 17, 19, and 21 for the taking lens, a shutter release button 23, a frame counter window 25, a film advance thumbwheel 27, and a direct see-through viewfinder 29. The release button 23, the counter window 25, the thumbwheel 27, and the viewfinder 29, like the taking lens 7, are located on the inner camera part 5. The outer sealed pack 11 is decorative in nature and is constructed of a paper-like material, such as cardboard. The inner camera part 5 is constructed of plastic.

At the manufacturer, the inner camera part 5 is loaded with a conventional 24-exposure 35 mm film cartridge and substantially the entire length of the unexposed filmstrip is factory prewound from the cartridge onto a take-up spool (not shown) of the camera part. After the customer takes a picture by depressing the release button 23, the thumbwheel 27 is manually rotated to rewind the exposed frame into the cartridge. The rewinding movement of the filmstrip the equivalent of one frame rotates a metering sprocket (not shown) to decrement a frame counter (not shown) to its next lower numbered setting. When substantially the entire length of the filmstrip is exposed and rewound into the cartridge, the single-use camera 1 is sent to a photofinisher who first removes the inner camera part 5 from the cardboard sealed pack 11 and then removes the filmstrip from the camera part. The filmstrip is processed, and the camera part and the opened pack are thrown away.

As shown in FIG. 4, the inner camera part 5 has a pair of flash synchronization access ports or openings 31 and 33 which extend through a front face 35 of the camera part at a location proximate the taking lens 7. The respective access ports 31 and 33 are aligned with corresponding recesses 37 and 39 which, as can bee seen in FIG. 5, are located proximate the single blade shutter 9. Normally, the two access ports 31 and 33 are covered by the outer sealed pack 11. See FIG. 1.

Figure 2:
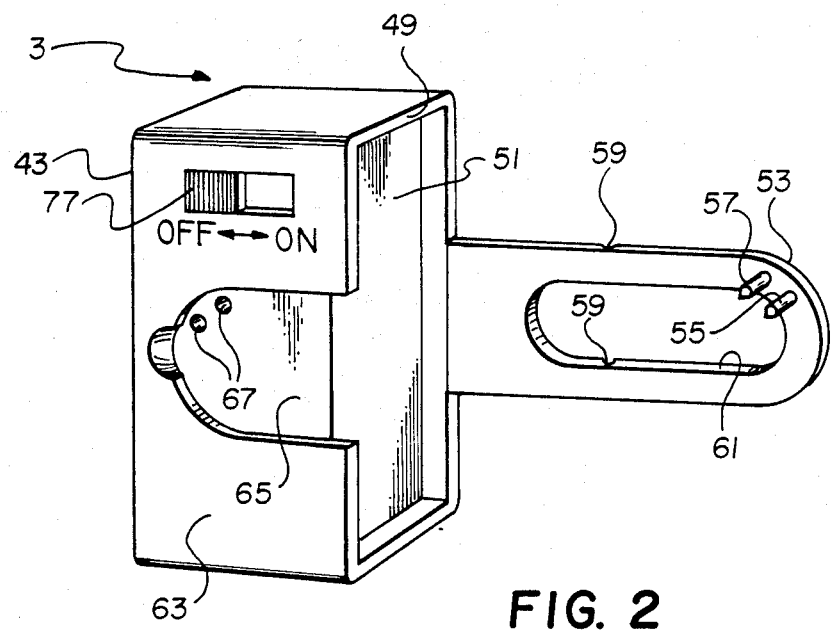
FIG. 2 is a rear perspective view of the flash unit, showing a folding arm of the flash unit in an operative or extended position.
Figure 3:
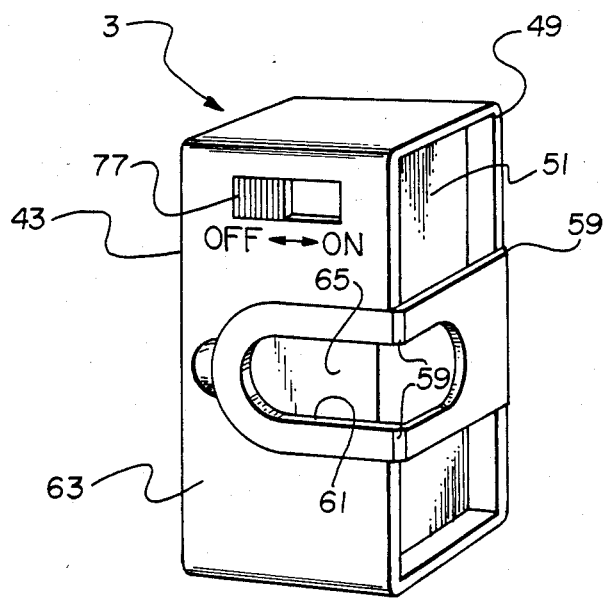
FIG. 3 is a rear perspective view of the flash unit, showing its folding arm in a storage or folded position.

The re-usuable flash unit 3, as can be seen in FIG. 1, includes a conventional flash emission device 41 which is partially encased in a plastic sheath 43 having an opening 45 for a flash emitting window 47 of the flash device. The sheath 43 has an edge or lipped portion 49 which extends beyond one side of the flash emission device 41 to define a pocket 51 for receiving one end of the disposable camera 1. A movable or folding arm 53, integrally formed with the sheath 43, supports a pair of electrically conductive flash synchronization pins 55 and 57 having pointed tips which permit the two pins to readily perforate the outer sealed pack 11 to enter the respective access ports 31 and 33 as schematically depicted in FIG. 1. The two pins 55 and 57 are electrically connected via respective leads (not shown), embedded in the folding arm 53, to the flash emission device 41. The folding arm 53 includes several "living" hinges 59 which enable the folding arm to be folded to a storage position, folded partially around the flash unit 3 as shown in FIG. 3, to make the flash unit compact, and to be unfolded to an operative position, extended from the flash unit as shown in FIGS. 1 and 2, to dispose the two pins 55 and 57 to perforate the outer sealed pack 11 at the respective access ports 31 and 33. The two pins 55 and 57 are forced through the outer sealed pack 11 to enter the respective access ports 31 and 33, and they bottom out in the corresponding recesses 37 and 39. See FIG. 5. An opening 61 in the folding arm 53 is shaped and dimensioned to align with the opening 13 of the outer sealed pack 11 when the folding arm is in its operative position.

As shown in FIGS. 2 and 3, a portion of the sheath 43, at a rear face 63 of the flash unit 3, is cut out to define a nest 65 for receiving the folding arm 53 when the arm is folded to its storage position. A pair of conical depressions 67 are provided in the flash emission device 41 to make room for the two pins 55 and 57. The two pins 55 and 57 are thus concealed between the flash emission device 41 and the folding arm 53 when the arm is in its folded position.

Figure 6:
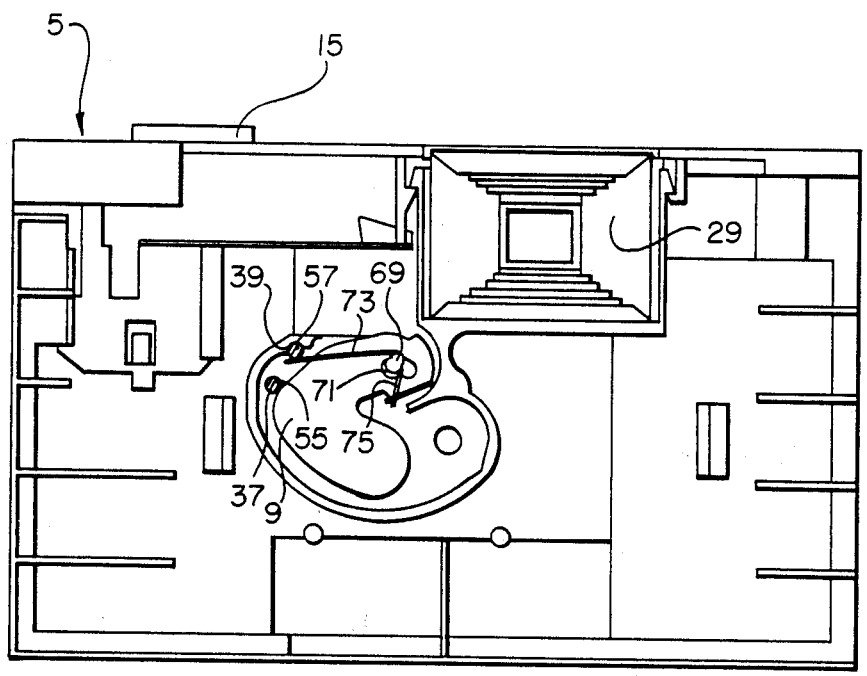
FIG. 6 is a front elevation view similar to FIG. 5, illustrating the shutter fully opened.

The shutter blade 9 is electrically conductive and is mounted for pivotable movement about a fixed pin 69, against the urging of an electrically conductive return spring 71, from a closed position shown in FIG. 5 to a fully opened position shown in FIG. 6. The access port 33 and its corresponding recess 39 are arranged to position the conductive pin 57 in continuous contact with one leg 73 of the return spring 71. Another leg 75 of the return spring 71 is connected to the shutter blade 9. The access port 31 and its corresponding recess 37 are arranged to position the conductive pin 55 in contact with the shutter blade 9 only when the shutter blade is fully opened. When the two conductive pins 55 and 57 enter the access ports 31 and 33 and bottom out in the corresponding recesses 37 and 39, and the shutter blade 9 is then fully opened, a conventional flash synchronization or trigger circuit (not shown) can be completed between the shutter blade and the flash emission device 41.

OPERATION

When the flash unit 3 is mated with the disposable camera 1 as shown in FIG. 1, the opening 61 in the folding arm 53 is positioned in proper relation with the taking lens 7 for a flash or daylight exposure and the two conductive pins 55 and 57 are forced through the outer sealed pack 11, directly into the respective access ports 31 and 33. The two conductive pins 53 and 55 bottom out in the respective recesses 37 and 39. See FIG. 4. Although not shown, mechanical means such as a latching device may be provided for firmly securing the flash unit 3 to the disposable camera 1.

Should flash photography rather than daylight photography be desired, a flash energizing switch member 77 of the flash device 41 must be manually moved from its "OFF" position to its "ON" position, to thereby activate a flash energizing circuit (not shown). Then, when the shutter blade 9 is fully opened, the flash emission device 41 will automatically be fired. Since the flash output reaches its peak almost immediately, i.e. there is no firing delay, the maximum brilliance of the flash light coincides with full opening of the shutter blade 9. Should daylight photography rather than flash photography be desired, the switch member 77 is left in its "OFF" position. Then, when the shutter blade 9 is fully opened, the flash emission device 41 will not be fired.

The invention has been described with reference to a preferred embodiment. However, it will be appreciated that variations and modifications can be effected within the ordinary skill in the art without departing from the scope of the invention. For example, the folding arm 43 may be a type which telescopes and collapses or slides between its storage and operative positions.

I claim:

1. An improved accessry re-usable electronic flash unit intended for use with a disposable single-use camera comprising an (a) inner camera part pre-loaded with film and including a taking lens, a shutter, and flash synchronization access ports, and (b) an outer sealed perforable pack containing said camera part and having an opening for said taking lens, wherein said flash unit has electrically conductive flash synchronization pins shaped to perforate said outer sealed pack to enter said access ports in order to connect the flash unit to said inner camera part, and wherein the improvement comprises:

a movable arm supporting said flash synchronization pins and adapted to be moved to a storage position on the flash unit to make said flash unit compact and to be moved to an operative position extended from the flash unit to dispose the pins to perforate said outer sealed pack to enter said access ports.

2. The improvement as recited in claim 1, wherein said movable arm supports said flash synchronization pins facing inwardly relative to said flash unit to conceal the pins when the movable arm is in its storage position and is arranged to expose the pins when the movable arm is in its operative position.

3. The improvement as recited in claim 2, wherein said movable arm is a folding arm having integral hinges for enabling the arm to be folded to its storage position and to be unfolded to its operative position.

4. The improvement as recited in claim 3, wherein said movable arm folds partially around said flash unit when the arm is moved to its storage position.

5. The improvement as recited in claim 4, wherein said flash unit has a rear face defining a nest for receiving said movable arm when the arm is moved to its storage position.

6. The improvement as recited in claim 1, wherein said movable arm has an opening shaped to substantially align with said opening of the outer sealed pack when the arm is moved to its operative position.

* * * * *